US010916040B2

United States Patent
Croxford et al.

(10) Patent No.: US 10,916,040 B2
(45) Date of Patent: Feb. 9, 2021

(54) PROCESSING IMAGE DATA USING DIFFERENT DATA REDUCTION RATES

(71) Applicants: Apical Ltd, Cambridge (GB); Arm Limited, Cambridge (GB)

(72) Inventors: Daren Croxford, Swaffham Prior (GB); Roberto Lopez Mendez, Cambridge (GB); Sean Tristram LeGuay Ellis, Cambridge (GB); Jayavarapu Srinivasa Rao, Cambridge (GB)

(73) Assignees: Apical Ltd., Cambridge (GB); Arm Limited, Cambridge (GB)

( * ) Notice: Subject to any disclaimer, the term of this patent is extended or adjusted under 35 U.S.C. 154(b) by 122 days.

(21) Appl. No.: 16/044,070

(22) Filed: Jul. 24, 2018

(65) Prior Publication Data
US 2020/0034993 A1  Jan. 30, 2020

(51) Int. Cl.
| | | |
|---|---|---|
| G06T 9/00 | (2006.01) | |
| G06T 15/00 | (2011.01) | |
| G06F 3/01 | (2006.01) | |
| G02B 27/01 | (2006.01) | |
| G06T 1/20 | (2006.01) | |

(52) U.S. Cl.
CPC ............ G06T 9/001 (2013.01); G02B 27/017 (2013.01); G06F 3/013 (2013.01); G06T 1/20 (2013.01); G06T 15/005 (2013.01)

(58) Field of Classification Search
CPC combination set(s) only.
See application file for complete search history.

(56) References Cited

U.S. PATENT DOCUMENTS

| | | | | |
|---|---|---|---|---|
| 10,514,541 | B2* | 12/2019 | Tantos | ........... H04N 21/234345 |
| 2013/0278631 | A1* | 10/2013 | Border | ............... G06F 3/04842 |
| | | | | 345/633 |
| 2015/0073907 | A1* | 3/2015 | Purves | .................. G06Q 20/32 |
| | | | | 705/14.58 |
| 2016/0210717 | A1* | 7/2016 | Adsumilli | ............ G06T 1/0028 |
| 2016/0260258 | A1* | 9/2016 | Lo | ........................ H04N 13/383 |
| 2017/0287112 | A1* | 10/2017 | Stafford | ............... G06F 3/0304 |
| 2017/0290504 | A1* | 10/2017 | Khaderi | ............... A63F 13/212 |
| 2018/0191952 | A1* | 7/2018 | Ardo | ................. H04N 21/2187 |
| 2019/0237021 | A1* | 8/2019 | Peng | ..................... G06F 1/3265 |
| 2019/0332522 | A1* | 10/2019 | Leydon | ............... G06F 11/3696 |

OTHER PUBLICATIONS

Doc-Ok.org; "Optical Properties of Current VR HMDs", Posted Apr. 1, 2016, pp. 1-44.

* cited by examiner

*Primary Examiner* — Helen Zong
(74) *Attorney, Agent, or Firm* — EIP US LLP (57) ABSTRACT

Examples of the present disclosure relate to methods for processing image data. In one such example, first data representing a rendered image is received. In some cases, second data useable to identify at least one target region of the rendered image is received, the at least one target region being associated with a gaze direction of a viewer. A first portion of the first data is processed in accordance with a first data reduction rate to derive first processed data, the first portion representing the at least one target region. A second portion of the first data is processed in accordance with a second data reduction rate, different from the first data reduction rate. The second portion represents a further region of the rendered image, different from the at least one target image. At least the first processed data is outputted.

19 Claims, 5 Drawing Sheets

PROCESSING IMAGE DATA USING DIFFERENT DATA REDUCTION RATES

BACKGROUND OF THE INVENTION

Technical Field

The present invention relates to methods, apparatus and computer-readable media for processing image data.

Description of the Related Technology

In some cases, it may be desired to display an image or video to a viewer at a high level of quality, for example at a high resolution and/or a high frame rate. This may be desirable when the display panel on which the image or video is being displayed is positioned very close to the viewer. This may be the case for virtual reality (VR), augmented reality (AR) or mixed reality (MR) head-mounted displays (HMDs), for example. Displaying images or videos at such a high level of quality may require a large amount of data to be processed, generated and/or transmitted. Furthermore, such devices may require image or video data to be captured, processed and displayed in substantially real time. Processing and transferring large amounts of data may require relatively large amounts of power.

Displaying such high quality image or video data may place a burden on interconnects and interfaces between different parts of an image processing system. For example, a display interface connecting a computing device with a display panel may have a limited data rate and/or bandwidth. Similarly, memory bandwidth in such a system may be constrained. Limitations in interface bandwidth and/or memory bandwidth can affect latency and cause bottlenecks when handling high resolution and/or frame rate image data.

Image or video data may be compressed for transmission or storage. The compressed data may be subsequently de-compressed for further use, e.g. display. Compressing the image or video data may, in some cases, help to reduce the burden on system interconnects and/or interfaces, by reducing the size of the data that is transmitted thereacross. However, image compression and de-compression may result in a loss of visual quality that is noticeable to a viewer. It is therefore desirable to provide efficient and effective image compression suitable for such systems, in which noticeable losses in visual quality are reduced.

SUMMARY

According to a first aspect of the present disclosure, there is provided a method for processing image data, the method comprising: receiving first data representing a rendered image; receiving second data useable to identify at least one target region of the rendered image, the at least one target region being associated with a gaze direction of a viewer; processing a first portion of the first data in accordance with a first data reduction rate to derive first processed data, the first portion representing the at least one target region; processing a second portion of the first data in accordance with a second data reduction rate, different from the first data reduction rate, the second portion representing a further region of the rendered image, different from the at least one target region; and outputting at least the first processed data.

According to a second aspect of the present disclosure, there is provided an apparatus for processing image data, the apparatus comprising: a receiver configured to: receive first data representing a rendered image; and receive second data useable to identify at least one target region of the rendered image, the at least one target region being associated with a gaze direction of a viewer; and a processor configured to: process a first portion of the first data in accordance with a first data reduction rate to derive first processed data, the first portion representing the at least one target region; process a second portion of the first data in accordance with a second data reduction rate, different from the first data reduction rate, the second portion representing a further region of the rendered image, different from the at least one target region; and output at least the first processed data.

According to a third aspect of the present disclosure, there is provided a non-transitory computer-readable storage medium comprising a set of computer readable instructions which, when executed by at least one processor, cause the at least one processor to: receive first data representing a rendered image; receive second data useable to identify at least one target region of the rendered image, the at least one target region being associated with a gaze direction of a viewer; process a first portion of the first data in accordance with a first data reduction rate to derive first processed data, the first portion representing the at least one target region; process a second portion of the first data in accordance with a second data reduction rate, different from the first data reduction rate, the second portion representing a further region of the rendered image, different from the at least one target region; and output at least the first processed data.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
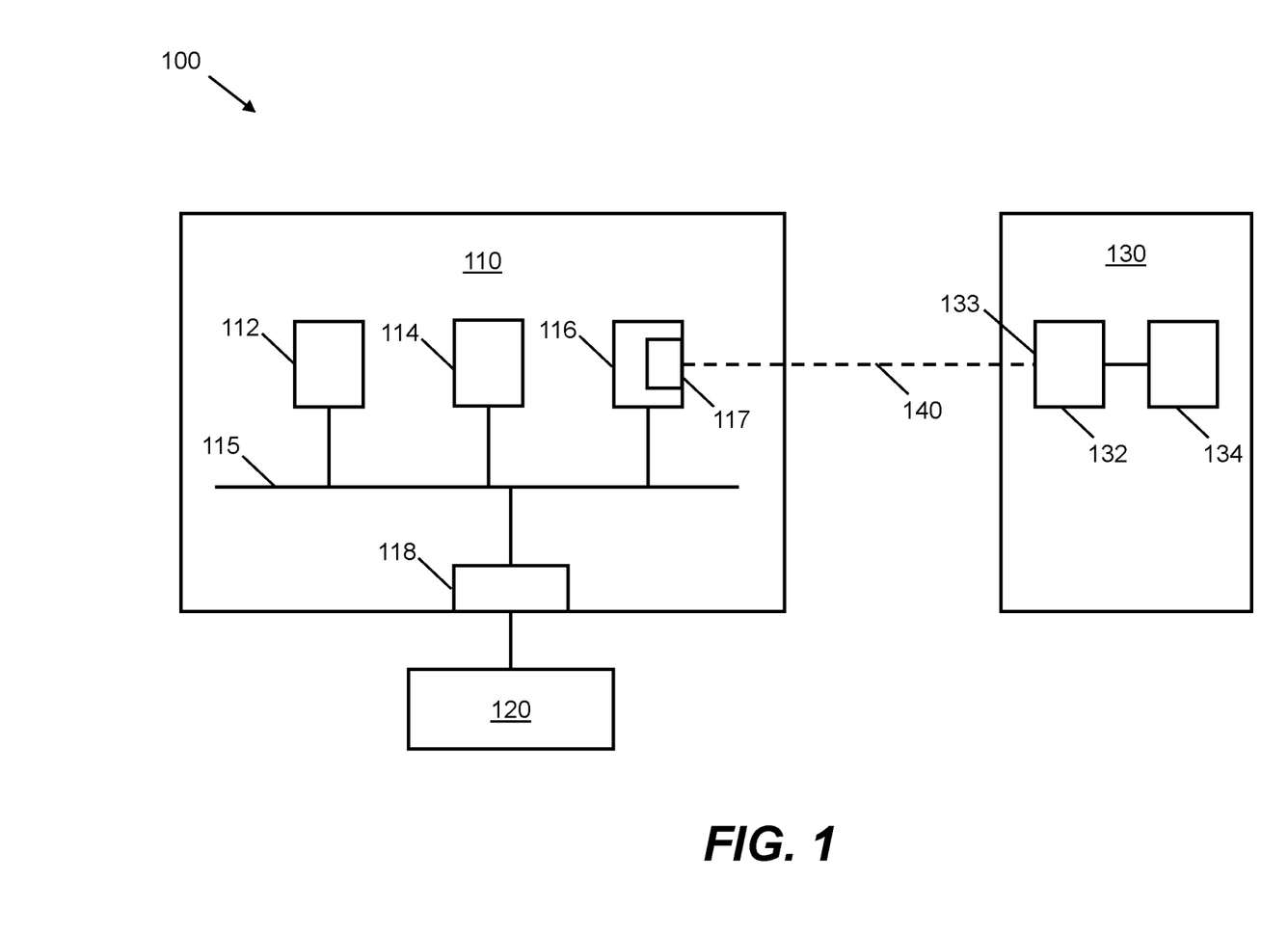
FIG. 1 shows schematically a system for implementing an image processing pipeline.

FIG. 1, provided for context, shows schematically a system 100 for implementing an image processing pipeline. The system 100 may form part of virtual reality (VR), augmented reality (AR) and/or mixed reality (MR) equipment. The system 100 may form part of other image processing arrangements in other examples. For example, the system 100 may form part of a television, mobile device or video gaming equipment.

The system 100 comprises an image processing apparatus 110. The image processing apparatus 110 is arranged to receive, process, generate, store and/or output image data. The image processing apparatus 110 may form part of or comprise a system on a chip (SoC) arrangement. In some examples, the image processing apparatus 110 forms part of a set-top box equipment, head-mounted device (HMD) or wireless display (e.g. Miracast™, or wireless HMD).

The image processing apparatus 110 comprises a plurality of processor components that are communicatively coupled via at least one bus 115. The at least one bus 115 has a limited bandwidth. Operations performed by the processor components may be carried out by hardware and/or software. Each of the processor components may be implemented using machine readable instructions and suitably programmed or configured hardware, such as circuitry. Each of the processor components can include a microprocessor, microcontroller, processor module or subsystem, programmable integrated circuit, programmable gate array or other computing device. The processor components may comprise multiple co-located processors or multiple disparately located processors. In some examples, the apparatus 110 comprises computer-useable volatile and/or non-volatile memory configured to store information and/or instructions for the processor components. The computer-useable volatile and/or non-volatile memory may be coupled with the bus 115. The computer-useable memory may comprise random access memory (RAM) and/or read-only memory (ROM).

In this example, the image processing apparatus 110 comprises a central processing unit (CPU) 112, a graphics processing unit (GPU) 114, a display controller 116 and a memory controller 118. Each of the CPU 112, GPU 114, display controller 116 and memory controller 118 may comprise a processor component of the apparatus 110. The apparatus 110 may comprise more, fewer and/or different components than those shown in the example of FIG. 1. For example, the apparatus 110 may comprise an image signal processor (ISP), video encoder and/or decoder, and/or one or more peripherals or input/output devices.

The memory controller 118 may comprise a dynamic memory controller (DMC). The memory controller 118 is coupled to a memory 120. The memory controller 118 is configured to manage the flow of data going to and from the memory 120. The memory 120 may comprise a main memory, otherwise referred to as a "primary memory". The memory 120 may be an external memory, in that the memory 120 is external to the image processing apparatus 110. For example, the memory 120 may comprise 'off-chip" memory. The memory 120 may comprise a central memory of a computing device within which the apparatus 110 is located. The memory 120 may have a greater storage capacity than the memory cache(s) of the CPU 112 and/or the GPU 114. In some examples, the memory 120 is comprised in the image processing apparatus 110. For example, the memory 120 may comprise 'on-chip' memory. The memory 120 may for example comprise a magnetic or optical disk and disk drive or a solid-state drive (SSD). In some examples, the memory 120 comprises a synchronous dynamic random-access memory (SDRAM). For example, the memory 120 may comprise a double data rate synchronous dynamic random-access memory (DDR-SDRAM). The memory 120 may be arranged to store image data corresponding to one or more images, each image corresponding to a different frame in a video. The stored image data may correspond to successive images in a video stream. The memory 120 may comprise a framebuffer arranged to store the image data.

The CPU 112 may comprise an image or video processor configured to process image or video data. The CPU 112 may be equipped with various image processing-related functionality. For example, the CPU 112 may be configured to perform object detection and/or recognition tasks, computer vision tasks, etc. The CPU 112 may be configured to obtain image data from the memory 120, or via an ISP coupled to one or more sensors and/or decoders. The CPU 112 is configured to output processed data to the memory 120 via the bus 115 and memory controller 118.

The GPU 114 is configured to process image or video data. The GPU 114 may comprise a greater number of cores or processing units than the number of cores in the CPU 112. Each of the cores of the GPU 114 may, individually, be relatively slow and/or unsophisticated compared to any of the cores of the CPU 112. A given core of the GPU 114 may therefore be less suitable for performing complex computational tasks compared with a given core of the CPU 112. However, the relatively large number of cores in the GPU 114 enables certain computational tasks, for example tasks with a relatively high degree of parallelism, to be performed more efficiently by the GPU 114 than by the CPU 112 since a relatively large number of processes may be carried out in parallel by the GPU 114. Examples of image-related computational tasks that may be performed more efficiently by the GPU 114 than by the CPU 112 include, but are not limited to, image rendering processes such as texture mapping, rendering polygons, shading, geometric calculations and motion compensation. The GPU 114 may also be used to perform tasks that are not image-related. The GPU 114 may be configured to obtain image data from the memory 120. In some examples, the GPU 114 obtains image data directly from the CPU 112 or a further processing unit (not shown) such as an ISP. The GPU 114 is configured to process the image data, for example to generate a rendered image, and to output the generated data to the memory 120 via the bus 115 and memory controller 118. For example, the generated data may be stored in a framebuffer.

The image processing apparatus 110 is communicatively couplable to a display device 130. Examples of display devices include, but are not limited to, head-mounted displays (HMDs), monitors, televisions, display panels and wearable display equipment. The display device 130 may be arranged remotely from the image processing apparatus 110. The display device 130 and the image processing apparatus 110 may be arranged in separate physical housings in some examples. In other examples, the display device 130 and the image processing apparatus 110 are comprised in the same physical housing.

The apparatus 110 is couplable to the display device 130 via a display interface 140. The display interface 140 may be referred to as a "display link". The display interface 140 may comprise a display serial interface (DSI). A DSI is an interface via which image or video data can be streamed to a display. The DSI may define a serial bus and a communication protocol between a source of image data and a destination of image data. The display interface 140 may comprise a display parallel interface (DPI). The display interface 140 may comprise any interface that is configured as an interconnect for streaming image or video data. The display interface 140 may comprise one high speed clock lane and one or more data lanes. Examples of suitable display interfaces include, but are not limited to, MIPI DSI, DisplayPort™, embedded DisplayPort™, Mobile High-Definition Link (MHL), High-Definition Multimedia Interface (HDMI), etc. In some examples, the display interface 140 is configured to carry multiple image or video streams. The display interface 140 may have a predetermined bandwidth or data rate limit. The bandwidth or data rate limit may determine the maximum rate at which image or video data can be transmitted via the display interface 140.

The display controller 116 may be referred to as a "display processor". The display controller 116 may comprise a video shifter. The display controller 116 may be configured to obtain image or video data from the memory 120, e.g. via the bus 115. In some cases, the display controller 116 is configured to receive image or video data directly from the GPU 114, CPU 112, or from a video decoder or ISP, i.e. without the image data having first been stored in and retrieved from the memory 120. The display controller 116 may be configured to process the obtained image or video data and generate a serial bitstream. A serial bitstream is a sequence of bits. The generated serial bitstream may then be used to output an image or video signal. The serial bitstream may be output for transmission via the display interface 140 to the display device 130. In some examples, the display controller 116 is responsible for video timing signals. Video timing signals may be used to synchronize component video data. Component video data is video data that is split into two or more component channels. For example, video data may be split into separate color channels. The display controller 116 may be configured with various other image or video processing functionality. For example, the display controller 116 may be configured with upscaling and/or downscaling functionality.

In this example, the display controller 116 comprises a data compressor 117. The data compressor 117 is configured to compress data generated by the display controller 116 for transmission via the display interface 140 to the display device 130. In some examples, the data compressor 114 is a separate component from the display controller 116, and is arranged to receive data output from the display controller 116, and compress such data.

The data compressor 117 may be configured to perform lossy data compression. In other examples, the data compressor 117 is configured to perform lossless compression. Performing data compression on data to be transmitted via the display interface 140 reduces the bandwidth required by the display interface 140 compared to a case in which uncompressed data is transmitted over the display interface 140 to the display device 130. Reducing bandwidth, without visibly impacting image quality, allows a lower cost, lower power solution to be implemented. Performing data compression on data to be transmitted also reduces an amount of power required to transmit the data.

The data compressor 117 may comprise a Display Stream Compression (DSC) compressor. A DSC compressor is a compressor that is configured to perform data compression in accordance with the VESA DSC standard. The DSC protocol is based on delta pulse code modulation (DPCM) with an Indexed Color History (ICH). The DSC protocol is an example of a visually lossless compression protocol. The DSC protocol may require that a given image is compressed with a given average bitrate. The bitrate may be configured to vary between different images in a sequence of images or may be fixed over the sequence of images. The data compressor 117 may be configured to perform data compression in accordance with compression protocols other than DSC in other examples.

Compressed data, having been generated by the data compressor 117, may be output for transmission over the display interface 140. The display device 130 comprises a corresponding de-compressor 132, which is configured to de-compress the data received via the display interface 140. The de-compressed data may then be displayed by a display panel 134 of the display device 130.

The system 100 may comprise more, fewer and/or different components than those shown in the example of FIG. 1.

Image data may be relatively large, particularly as the use of higher resolution, higher frequency, higher dynamic range, and/or higher pixel density video displays has increased. Image data representing rendered images generated by a GPU may be particularly large. As such, the amount of pixel data sent over the bus 115 and/or the display interface 140 may be large. For example, some AR, VR or MR systems require one or two high resolution displays each operating at a high frequency, e.g. 90 or 120 Hz, in order for the displays to be positioned close to the eyes of a user whilst maintaining a high level of perceived visual quality and without user discomfort. A high refresh frequency may be required in AR, VR or MR systems in order to reduce the likelihood of motion sickness due to latency. Where two displays are used, e.g. one to be positioned in front of each eye, video streams for both displays may be transmitted across a single display interface, further increasing the amount of data to be transmitted and burdening the physical layer underlying the interface. Some display interfaces and/or buses may be unable to handle such high resolution images with high frame rates and/or refresh rates. As such, the limited bandwidth of the display interface and/or bus may be a bottleneck preventing further increases in image quality. Those display interfaces and/or buses that do have a bandwidth capable of handling such images may require a relatively large amount of power and/or may be relatively expensive.

Figure 2:
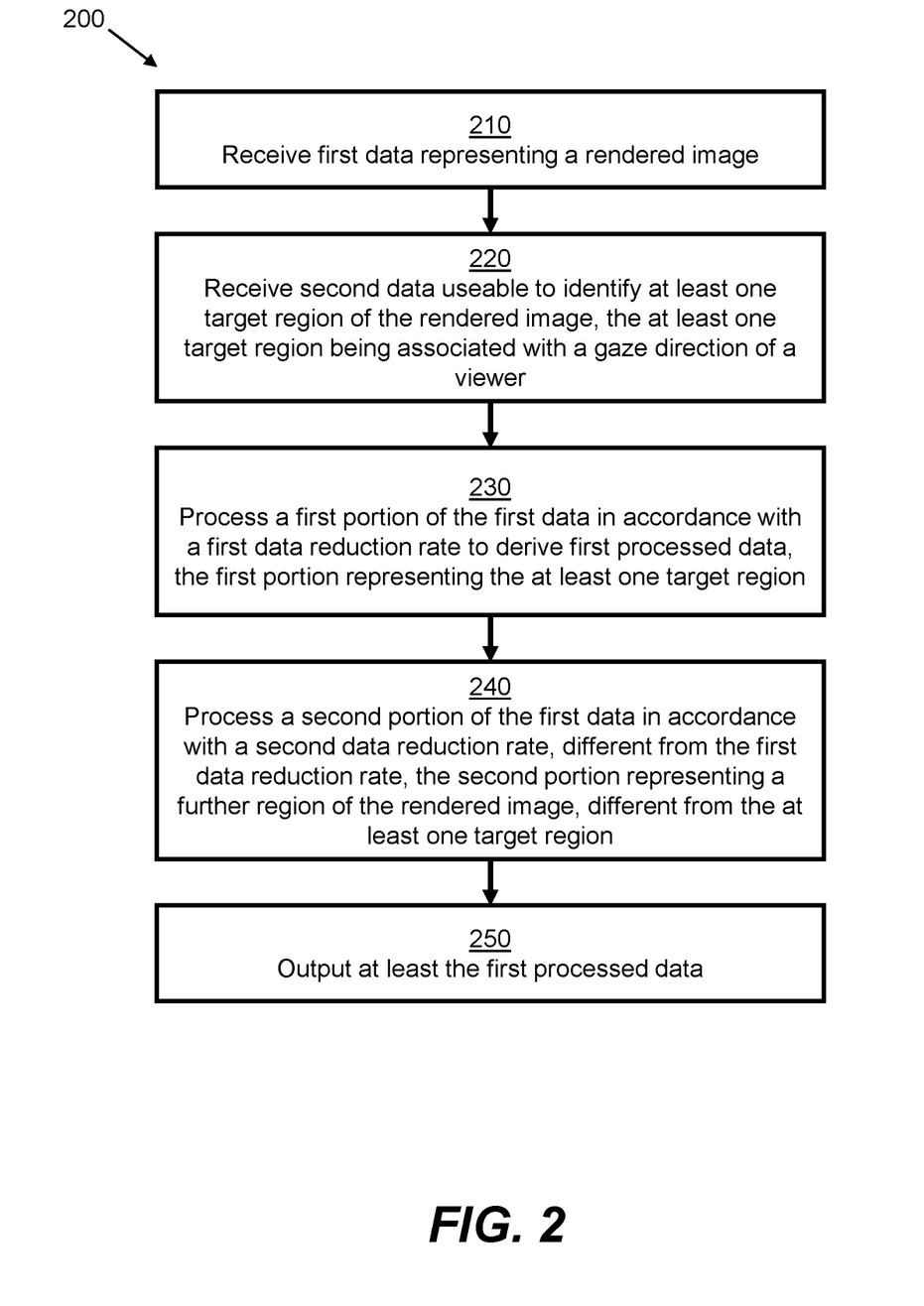
FIG. 2 shows schematically a method of processing image data according to an example.

FIG. 2 shows schematically a method 200 for processing image data according to an aspect of the present disclosure. At least one portion of the method 200 may be implemented by the display controller 116, data compressor 117 or GPU 114 shown in FIG. 1.

In an example, at least one portion of the method 200 is implemented by executable code, stored on a non-transitory storage medium, that includes instructions, that when executed by at least one processor, causes the at least one processor to perform the at least one portion of the method 200 described herein. In another case, at least one portion of the method 200 is implemented by at least one ASIC. The ASIC may be standard, fully customized or partially customized. In one example, the ASIC may have a structured design. The ASIC may comprise at least one microprocessor and/or at least one memory block. In another example, the ASIC comprises at least one gate array such as a field-programmable gate array. The field-programmable gate array may comprise an array of programmable logic blocks and a hierarchy of reconfigurable interconnects. The array of programmable logic blocks may, in some examples, comprise memory elements such as flip-flops. The computer readable instructions may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

At block 210, first data is received. The first data represents an image. In some examples, the image is a rendered image. The rendered image may be generated by a GPU, such as the GPU 114 shown in FIG. 1. In some examples, the rendered image is generated by a CPU, such as the CPU 112 shown in FIG. 1. In some examples, the image is a frame of a video comprising a sequence of multiple such frames. For example the video may be generated by a video decoder. In some examples, the image is generated by an ISP, or may be a composited image, e.g. a mix of video and graphics, for example subtitles overlaid on a video. Compositing may be performed by a GPU or a display processor, for example.

In some examples, the image is a computer graphics image. A computer graphics image is an example of a rendered image. When a computer graphics image is generated, it may first be defined as a set of geometries, for example as a series of primitives. An example of a primitive is a polygon. The geometries are then divided into graphics fragments in a rasterization process. This is followed by graphics rendering. During a graphics rendering operation, a renderer may modify data associated with each fragment so that the fragments can be displayed correctly. Examples of such data include color and transparency data. Once the fragments have traversed the renderer, their associated data values may be stored in memory, e.g. a framebuffer, to be subsequently displayed and/or transmitted. Other methods of graphics rendering may be used in other examples.

At block 220, second data is received. The second data is useable to identify at least one target region of the image. The at least one target region is associated with a gaze direction of a viewer. In some examples, the at least one target region corresponds to a field of view in the image of a viewer. The at least one target region may correspond exactly to the field of view of the viewer or may, for example, be slightly larger than but encompass the field of view of the viewer. The at least one target region may comprise at least one region of interest. In an example, the at least one target region corresponds to one or more fixation points of a viewer, for example in that the fixation point(s) may be within the at least one target region of the image. The at least one target region may comprise multiple target regions or only one target region. When the image is of a 360 degree environment, for example a classical music concert, a user experiencing that environment, for example through the use of a virtual reality HMD or mobile phone, may only be viewing a sub-region of the environment at any given time and not the entire environment.

In some examples, the second data comprises eye-tracking data. Eye-tracking data may be generated by an eye-tracking sensor. Such a sensor may be arranged in an HMD, for example. In some examples, the second data comprises data indicating the at least one target region. The data indicating the at least one target region may have been derived based on eye-tracking data. As such, the second data may be obtained either directly or indirectly from an eye-tracking mechanism. In some examples, the second data is not obtained using an eye-tracking mechanism. For example, the second data may be obtained using a head-tracking mechanism.

The second data may comprise data indicating an image region at which a viewer is predicted to be looking. In some examples, the second data is obtained based on object detection, object tracking and/or object recognition in the image. A given image region may be identified as the target region on the basis that the given region includes a predetermined type of object. The predetermined type of object may be a type of object that a viewer has a relatively high likelihood of looking at, compared to other types of object and/or image features. For example, if an image depicts a car driving along a road underneath a sky, the target region may be identified as the region containing the car, on the basis that there is a higher likelihood of a viewer looking at the car than the road or the sky.

At block 230, a first portion of the first data is processed to derive first processed data. The first portion of the first data represents the at least one target region. The first portion of the first data is processed in accordance with a first data reduction rate. The first processed data may be smaller than the first portion of the first data. In some examples, the first processed data is the same size as the first portion of the first data. In such examples, the first data reduction rate may be zero.

At block 240, a second portion of the first data is processed. The second portion represents a further region of the image. The further region is different from the at least one target region. The further region of the image may be outside of the field of view of the viewer of the image. The further region may, for example, comprise one or more peripheral regions of the image that surround a focus region. The second portion of the first data is processed in accordance with a second data reduction rate. The second data reduction rate is different from the first data reduction rate. In some examples, the second data reduction rate is higher than the first data reduction rate. The second data reduction rate may be non-zero. In some examples, the second data reduction rate is lower than the first data reduction rate. Data reduction may be performed by reducing a dynamic range, visual quality (that is not perceptible by the viewer), resolution, precision, etc. Data reduction may be performed in other ways in other examples.

In some examples, processing the first portion of the first data comprises compressing the first portion of the first data in accordance with a first compression ratio. Processing the second portion of the first data comprises compressing the second portion of the first data in accordance with a second, different, compression ratio. In some examples, the second compression ratio is higher than the first compression ratio. For example, the first compression ratio (as a ratio between uncompressed size and compressed size) may be 3:2, and the second compression ratio may be 3:1. As such, the second portion of the first data may be compressed more aggressively than the first portion of the first data. In some examples, the second compression ratio is lower than the first compression ratio. As such, the second portion of the first data may be compressed less aggressively than the first portion of the first data.

In some examples, processing the first portion of the first data comprises performing lossless or visually lossless compression on the first portion of the first data. Lossless compression is a type of data compression in which the original uncompressed data can be reconstructed from the compressed data. Visually lossless compression is a type of lossy compression in which the data that is lost as a result of compression and de-compression is not detectable to the eye. In some examples, the first portion of the first data is not compressed. Processing the second portion of the first data may comprise performing lossy compression on the second portion of the first data. In lossy compression, not all of the uncompressed data can be recovered from the compression and de-compression process. In some examples, the first portion of the first data and the second portion of the first data are compressed with different lossy compression rates.

In some examples, processing the first portion of the first data comprises compressing the first portion of the first data in accordance with a first data rate target. Processing the second portion of the first data may comprise compressing the second portion of the first data in accordance with a second, different, data rate target. An example of a data rate is a bitrate. As such, the first and second data rate targets may comprise first and second bitrate targets, respectively. Other examples of data rates include, but are not limited to, information rates, data sampling rates, payload rates, etc. A data rate target may be used to allocate a data rate to a portion of image data in order to compress and/or encode the portion of image data at a particular level of quality. As such, a given data rate target may be associated with a given level of quality. The first data rate target and the second data rate target may be derived in dependence on an overall data rate target for compressing the first data. An example of an overall data rate target is a total data rate target. The overall data rate target may be predetermined for a given image. The overall data rate target may correspond to an average number of bits per pixel across the image. The overall data rate target may be constant over a given time period, or may be configured to vary over the given time period. Deriving the first and second data rate targets in dependence on an overall data rate target for compressing the first data allows variable compression across the image to be performed whilst conforming to compression protocols that require a predetermined overall (or average) data rate for the entire image, e.g. the DSC protocol.

In some examples, processing a given portion of the first data comprises discarding a predetermined number of least significant bits (LSBs) in the given portion of the first data. Discarding LSBs may reduce an amount of loss of visual quality compared to a case in which bits other than LSBs are discarded. The predetermined number is associated with the given portion. In such examples, the first data reduction rate comprises a first number of LSBs to be discarded and the second data reduction rate comprises a second, different, number of LSBs to be discarded. As such, different numbers of LSBs may be discarded for different regions of the image. For example, a smaller number of bits may be discarded for the at least one target region, which may be for display at a relatively high level of quality, and a greater number of bits may be discarded for the further region, which may be for display at a relatively low level of quality. In some examples, all bits for the further region are discarded. In other words, in such examples, the second portion of the first data may be discarded altogether.

In some examples, for example where the method 200 is performed by the display controller 116 or the data compressor 117 shown in FIG. 1, processing a given portion of the first data comprises compressing the given portion of the first data using a DSC protocol. As such, foveated compression may be performed for transmission across a display interface whilst conforming to the DSC specification, thereby reducing a need to modify existing systems, or introduce new systems, which are not compliant with the DSC standard. Other data compression protocols may be used in other examples, however.

In some examples, the first and the second data reduction rates are derived based on obtained metadata. An example of metadata is tile quality metadata. Tile quality metadata indicates a desired quality of compressed data corresponding to a given region (or "tile") of a rendered image. Tile quality metadata may be used to identify a data reduction rate to be used to process data corresponding to a given image region.

At block 250, at least the first processed data is outputted.

By processing the first and second portions of the first data using different data reduction rates, an amount of data used to represent the image may be reduced without reducing a perceived visual level of quality. Reducing the amount of data used to represent the image facilitates more efficient image data processing. Additionally, reducing the amount of data used to represent an image enables the latency in receiving, processing, generating and/or outputting such data to be reduced without the expense of having to increase the bandwidth of the bus 115 and/or the display interface 140.

The human visual system has variable visual acuity. The human eye has most of its receptors in the fovea, which is the area of the eye responsible for sharp central vision. The fovea is small compared to the full field of vision. For some displays, such as near-eye displays, the eye can only perceive a subset of the information on the display at any instant. Foveated compression adapts image data compression to try to limit visual artefacts to the display areas that the fovea cannot see. Foveated compression can therefore be used to reduce a burden on the bus 115 and/or the display interface 140 caused by the use of high resolution and/or high frequency image data. The first portion of the first data, representing at least one target region associated with a gaze direction of the viewer, may be compressed less aggressively than the second portion of the first data, representing a further region of the image. Thus, perceived image quality of the subsequently de-compressed and displayed image may be maintained, or at least visual losses reduced, in the image region that the viewer is looking at. Artefacts or visible losses of information in other regions are less likely to be detected by the viewer, so image data for those regions may be compressed more aggressively.

Some VR, AR and/or MR headsets comprise foveated lenses which distort captured images, such that the peripheral regions of a captured image have a lower level of visual quality than the central region. By applying foveated image compression to such images, losses due to more aggressive compression in the peripheral regions may be less noticeable, or more acceptable, than a case in which foveated compression is applied to uniformly high quality images. The display device 130 may comprise such a headset in some examples.

In some examples, processing the first portion of the first data comprises using a first compression scheme, and processing the second portion of the first data comprises using a second, different, compression scheme. For example, different compression algorithms or codecs may be used to compress different portions of image data, based on where in the image a viewer is looking.

In some examples, the at least first processed data is outputted for transmission via a display interface to a display device. For example, the at least first processed data may be outputted by the data compressor 117 of the display controller 116, as shown in FIG. 1. The at least first processed data may be outputted for transmission via a DSI, DPI, or any other video/image streaming interface. In some examples, the image is outputted for transmission to a wireless display device, e.g. a wireless HMD. The image may be transmitted over a wireless interface, e.g. using a Miracast™ wireless connection.

In some examples, the at least first processed data is outputted to memory. For example, the at least first processed data may be outputted by the GPU 114, as shown in FIG. 1. The at least first processed data may be outputted to a framebuffer.

In some examples, the second data is outputted. For example, the second data may be outputted for transmission to the display device, e.g. via the display serial interface. The second data may be transmitted to enable the display device to de-compress and/or display the first processed data. For example, the second data may enable the display device to determine the bitrate targets that were used to compress each region of the image, and thus to accurately process the received bitstream to recover the image. Outputting the second data to the display device also reduces a need to provide the display device with a separate eye-tracking data feed. Outputting the second data may thus facilitate accurate and efficient processing by the display device.

In some examples, processing the second portion of the first data comprises deriving second processed data. The second processed data may be outputted. For example, the second processed data may be outputted to a memory and/or for transmission via the display stream interface to the display device. Outputting the second processed data enables the further portion of the image to be subsequently reconstructed and/or displayed. In some examples, the second processed data is outputted to memory. For example, the second processed data may be outputted to the framebuffer. The second processed data may be generated and/or outputted at a lower resolution, lower dynamic range and/or lower precision than the first processed data. The first and second processed data may be stored in first and second respective framebuffer portions. The first and second framebuffer portions may be located together or separately in memory.

In some examples, a third portion of the first data is processed in accordance with a third data reduction rate. The third data reduction rate is intermediate the first data reduction rate and the second data reduction rate. The third portion of the first data represents a region of the image that is located between the at least one target region and the further region. In an example, the at least one target region is for display at a first level of quality, the further region is for display at a second, lower, level of quality, and the region represented by the third portion of the data is for display at a third level of quality, intermediate the first and second levels of quality. In some examples, further portions of the first data are processed in accordance with further data rate targets. As such, differences in displayed visual quality between a focus region and a peripheral region may be made more gradual than a case in which only two data reduction rates are used, one for the focus region and one for the peripheral region. Gradually varying the data reduction rate across an image may reduce the likelihood that a viewer will notice, or will be distracted by, a drop in visual quality towards the peripheral regions of the image.

Prior to receiving the first data representing the rendered image, the at least one target region of the rendered image may, in some examples, be rendered at a first level of quality, and the further region of the rendered image may be rendered at a second, different, level of quality. In some examples, the rendered image represented by the first data is a result of a foveated rendering process. Foveated rendering involves rendering an image region corresponding to a current fixation point of a fovea of a viewer at a higher level of quality, e.g. resolution, and rendering other image regions, e.g. peripheral regions, at a lower level of quality. Foveated rendering may reduce the rendering burden on a GPU, by rendering peripheral regions of the image at a lower resolution, rather than rendering the entire image at the highest resolution, for example. In other examples, the at least one target region and the further region are rendered at the same level of quality. As such, foveated rendering is not performed in some examples.

In some examples, the rendered image represented by the first data comprises a current frame of a video. Third data representing a previous frame of the video may be obtained. For example, the third data may be retrieved from memory. The first data and the third data may each comprise one or more signature values representative of the current and the previous frames, respectively. An example of a signature value is a hash value, such as a cyclic redundancy code (CRC) value. In some examples, different signature values are obtained for different image regions. The signature values may relate to color channel values for pixels in the different image regions, for example. In some examples, more than one signature value is obtained for a given image region. For example, two signature values may be obtained for each image region. A first signature value may represent relatively coarse-grained information, e.g. a set of most significant bits (MSBs) in a sequence of bits. A second signature may represent relatively fine-grained information, e.g. a set of least significant bits (LSBs) in the sequence of bits.

In an example, processing a given portion of the first data comprises deriving a measure of similarity between the given portion of the first data and a portion of the third data. For example, signature values representative of image data for different frames may be compared. The measure of similarity may be derived between the given portion of the first data and a corresponding portion of the third data, namely a portion of the third data that represents the same image region as that represented by the given portion of the first data. In other examples, the measure of similarity is derived between the given portion of the first data and a portion of the third data that represents a different image region to that represented by the given portion of the first data.

In response to determining that the derived measure of similarity has a predetermined relationship with a similarity threshold associated with the given portion, the given portion of the first data is outputted. The given portion of the first data may be outputted to a framebuffer or to a display device according to examples. That is, the given portion of the image data may be 'refreshed'. In some examples, the predetermined relationship comprises the derived measure of similarity exceeding the similarity threshold. In other examples, the predetermined relationship comprises the derived measure of similarity being below the similarity threshold.

If the derived measure of similarity does not have the predetermined relationship with the similarity threshold associated with the given portion, the given portion of the first data may not be outputted. That is, the given portion of the image data may not be 'refreshed'. The first data reduction rate may comprise a first similarity threshold and the second data reduction rate may comprise a second, different, similarity threshold. Varying the similarity thresholds between different image regions based on where a viewer is looking enables a refresh rate to be reduced in regions other than where the viewer is looking, without an overall reduction in visual acceptability. Thus an amount of data to be processed and/or transmitted may be reduced without a related reduction in visual acceptability for a viewer. For example, in a focus region, where the viewer is more likely to notice changes between frames, a first similarity threshold may be selected such that only relatively small differences between the previous frame and the current frame are required in order to trigger a refresh of that region. In peripheral regions, however, where the viewer is less likely to notice changes between frames, a second, different, similarity threshold may be selected such that relatively large differences between the previous frame and the current frame are required in order to trigger a refresh of those regions. Thus, partial refreshing of the image may be performed based on where in the image the viewer is looking. Such partial refreshing may be more efficient in terms of processing and/or transmission of data compared to cases in which such partial refreshing is not used.

In some examples, for example where first and second signature values are obtained for a given image region, the similarity threshold may relate to whether or not the second, finer-grained signature values are compared between different frames. For example, the first, coarser-grained signature values may be compared regardless of which image region is being considered, whereas the second, finer-grained signature values may be compared only for the at least one target region. In another example, the second, finer-grained signature values are not compared for the at least one target region, but are compared for other image regions. This may reduce an amount of processing compared to a case in which both signature values are compared for every image region. In some examples, if a measure of similarity between the first signature values for corresponding regions of different frames has a predetermined relationship with a similarity threshold, then the second signature values for those regions are also compared. If the measure of similarity between the first signature values for those regions does not have the predetermined relationship with the similarity threshold, then the second signature values for those regions are not compared. In such examples, the similarity thresholds vary between different image regions, namely between the at least one target region and the further image region.

In some examples, the first processed data is arranged to indicate whether or not the given portion of the first data is outputted. Indicating whether or not the given portion of the first data is outputted, or 'refreshed', enables a downstream device, e.g. a display device, to be informed whether or not it is to retrieve image data corresponding to the previous frame from memory. For example, if the given portion of the first data is not outputted, the downstream device may be informed of such and may thus re-use the corresponding region from the previous frame. If, on the other hand, the given portion of the first data is outputted, the downstream device may avoid having to retrieve the corresponding region of the previous frame from memory, thereby reducing an amount of processing and/or latency at the downstream device.

Figure 3:
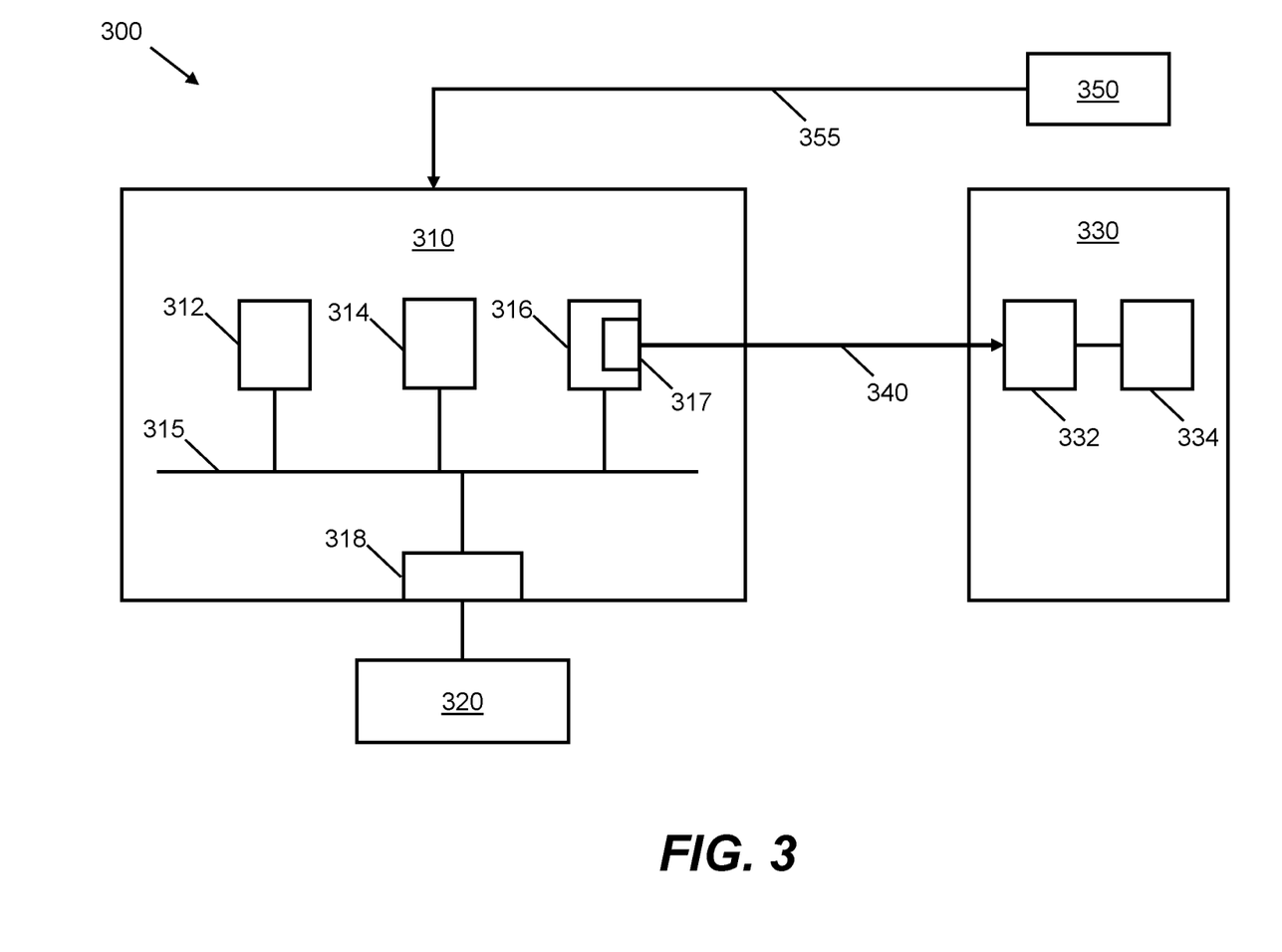
FIG. 3 shows schematically a system for implementing an image processing pipeline according to an example.

FIG. 3 shows schematically a system 300 for implementing an image processing pipeline according to an example. Components of the system 300 may be configured to perform at least a portion of the methods described herein. Some items depicted in FIG. 3 are similar to items shown in FIG. 1. Corresponding reference signs, incremented by 200, have therefore been used for similar items.

In this example, the system 300 comprises an eye-tracking device 350. The eye-tracking device 350 is configured to perform eye-tracking, also known as gaze-tracking. The eye-tracking device 350 may comprise one or more eye-tracking sensors configured to track eye movement and/or determine a gaze location and/or gaze direction of a viewer of an image. The eye-tracking device 350 may be comprised in the display device 330 in some examples. For example, where the display device 330 comprises an HMD, the eye-tracking device 350 may form part of and/or be mounted upon the HMD. In other examples, the eye-tracking device 350 is separate from the display device 330.

The eye-tracking device 350 is configured to generate eye-tracking data 355. The eye-tracking data 355 is useable to identify at least one target image region associated with a gaze direction of a viewer. The eye-tracking data 355 may relate to a current fixation point of the fovea of at least one eye of the viewer. The at least one target region may relate to a sub-region of the image centered around the current fixation point of the fovea of the at least one eye of the viewer.

The eye-tracking device 350 is configured to output the eye-tracking data 355 to the image processing apparatus 310. In some examples, the eye-tracking data 355 is received by the image processing apparatus 310 via one or more peripherals. The eye-tracking data 355 may be received as metadata. The eye-tracking data 355, having been received by the image processing apparatus 310, may be stored in memory, for example in the central memory 320 and/or in local or 'on-chip' memory.

In this example, the data compressor 317 comprised in or connectable to the display controller 316 is configured to perform foveated data compression on received image data, e.g. data representing a rendered image. The data compressor 317 is configured to receive the eye-tracking data 355, or data derived therefrom, to enable the data compressor 317 to infer which region(s) of a given image a viewer is looking at. The data compressor 317 is configured to compress different image regions separately. The number of image regions to be individually compressed may be constant or variable. Individually compressible image regions may have the same size or different sizes as one another, according to examples.

The data compressor 317 is configured to process a first portion of received image data in accordance with a first data reduction rate to produce first processed data, the first portion representing the region(s) the viewer is looking at, and process a second portion of the received image data in accordance with a second, different, data reduction rate. The data compressor 317 is configured to output at least the first processed data via the display interface 340 to the display device 330. An amount of data sent via the display interface 340 may thus be reduced compared to a case in which the data compressor 317 does not perform foveated compression. By reducing the amount of data used to represent a given image at a given level of quality, e.g. a given resolution, the level of quality of the image may be increased without the expense of having to increase the bandwidth or maximum data rate of the display interface 340. Thus perceived visual quality and user experience may be increased, whilst reducing cost and/or hardware requirements.

In some examples, metadata may be sent over the display interface 340 indicating the data reduction rates to the display device 330. For example, the metadata may indicate one or more compression rates, dynamic ranges, etc.

In some examples, the data compressor 317 does not itself receive the eye-tracking data 355. For example, the CPU 312 or the display controller 316 may process the eye-tracking data 355, or data derived therefrom, and inform the data compressor 317 which portions of the image data are to be processed in accordance with which data reduction rate.

The data compressor 317 may comprise a DSC compressor. The data compressor 317 may use a bitrate control logic to compress data. In an example, the data compressor 317 is configured to vary the bitrate between different image regions or tiles. The data compressor 317 may tune or adjust the bitrate control logic in order to vary the bitrate allocated to the different image regions. For example, a higher bitrate may be used to compress the first portion of the image data and a lower bitrate may be used to compress the second portion of the image data. The different image portions may be compressed in accordance with different bitrate targets. The bitrate targets may be determined based on an overall, or average, bitrate target for the image as a whole. For example, the bitrate target used for the compression of the first portion of the image data may be higher than the average bitrate target for the image, and the bitrate target for the compression of the second portion of the image data may be complementarily lower than the average bitrate target for the image.

In some examples, when data representing a given image region is compressed by the data compressor 317, the bitrate is constant across the given image region. In other examples, the bitrate is not constant across the given image region. For example, the bitrate may be higher for an initial part of the given image region, the initial part being the first part to be compressed, and the bitrate may be lower for a later part of the given image region to be compressed. This may be due to an absence of image history when the initial part is compressed, where an image history is progressively built as the given image region is compressed.

Figure 4:
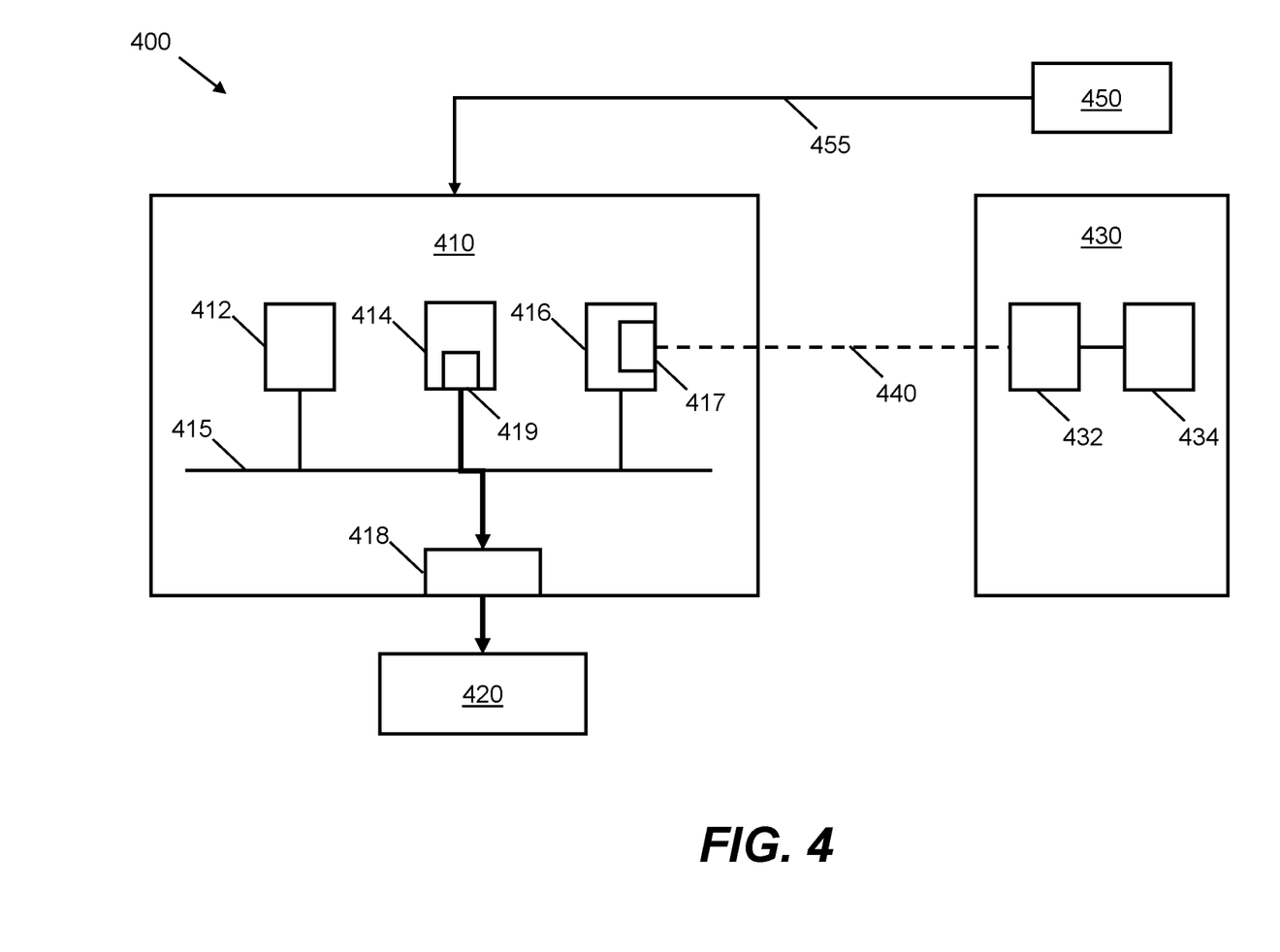
FIG. 4 shows schematically a system for implementing an image processing pipeline according to an example.

FIG. 4 shows schematically a system 400 for implementing an image processing pipeline according to an example. Components of the system 400 may be configured to perform at least a portion of the methods described herein. Some items depicted in FIG. 4 are similar to items shown in FIG. 3. Corresponding reference signs, incremented by 100, have therefore been used for similar items.

In this example, the GPU 414 comprises a GPU data compressor 419. The GPU data compressor 419 may be configured to perform tile-based compression on data outputted by the GPU 414, e.g. a rendered image. In this example, the GPU data compressor 419 is configured to perform foveated compression on data outputted by the GPU 414. In some examples, the GPU data compressor 419 is separate from the GPU 414.

In this example, the GPU 414 and/or the GPU data compressor 419 receives the eye-tracking data 455, or data derived therefrom, generated by the eye-tracking device 450, to enable the GPU data compressor 419 to infer which region(s) of a given image a viewer is looking at. The GPU data compressor 419 is configured to process, in accordance with a first data reduction rate, a first portion of image data generated by the GPU 414, to produce first processed data. The first portion represents the region(s) the viewer is looking at. The GPU data compressor 419 is configured to process a second portion of the image data in accordance with a second, different, data reduction rate. In some examples, the GPU data compressor 419 is configured to compress the first portion of the image data using a first compression rate, and compress the second portion of the image data using a second compression rate. The first compression rate may correspond to lossless compression or a relatively high quality lossy compression. The second compression rate may correspond to a relatively low quality lossy compression. As such, variable rate compression may be performed by the GPU data compressor 419. In some examples, the second region The GPU data compressor 419 is configured to output at least the first processed data to the memory 420 via the bus 415. For example, the at least first processed data may be output to a framebuffer.

In some examples, the GPU data compressor 419 does not itself receive the eye-tracking data 455. For example, the CPU 412 may process the eye-tracking data 455 or data derived therefrom, and inform the GPU 414 or the GPU data compressor 419 which portions of the image data are to be processed in accordance with which data reduction rate. Tile Quality Map (TQMAP) metadata may be used to indicate a desired compression quality for a given tile of image data. A data reduction rate for compressing the given tile may be derived based on the desired compression quality indicated by the TQMAP metadata.

The image data generated by the GPU 414 and compressed by the GPU data compressor 419 may represent a rendered image. In some examples, prior to being compressed by the GPU data compressor 419, different regions of the rendered image are rendered at different levels of quality, e.g. based on the eye-tracking data 455. As such, foveated rendering may be performed prior to, and in addition to, foveated compression of the rendered image data. In such examples, the eye-tracking data 455 may be used more than once. Namely, the eye-tracking data 455 is used firstly for foveated rendering, and secondly for foveated compression. Therefore, the eye-tracking data 455, which is already provided to the image processing apparatus 410 to perform foveated rendering, may be re-used in order to perform additional foveated compression. Alternatively, the GPU 414, having performed foveated rendering of the image, may inform the GPU data compressor 419 and/or or the data compressor 417 which regions of the image have been rendered at a higher level of quality and which regions have been rendered at a lower level of quality, to allow the GPU data compressor 419 and/or or the data compressor 417 to determine how the rendered image is to be compressed. This may reduce an amount of data that is generated, transmitted, processed and/or received compared to a case in which separate eye-tracking data is obtained for performing foveated compression. In other examples, foveated rendering is not performed. That is, in such examples, an image is rendered at a uniform level of quality, prior to foveated compression being performed.

In some examples, both the GPU data compressor 419 and the data compressor 417 comprised in or coupled to the display controller 416 perform foveated compression on image data to be displayed. In other examples, only one of the GPU data compressor 419 and the data compressor 417 performs foveated compression. In either case, foveated compression may be performed on a rendered image, that is, downstream of a rendering stage in an image processing pipeline. In other examples, however, foveated compression is performed on image data that does not represent a rendered image.

Figure 5:
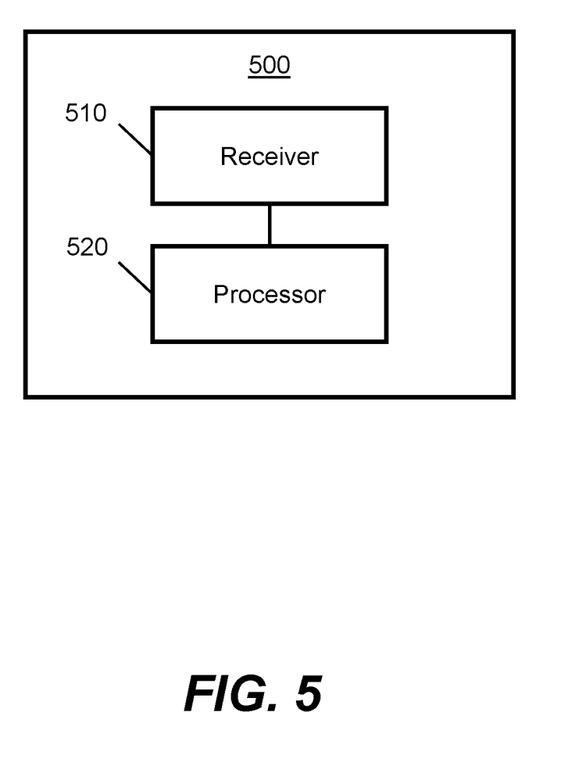
FIG. 5 shows schematically an apparatus for implementing methods such as the method of FIG. 2.

FIG. 5 shows schematically an apparatus 500 for implementing methods such as the method 200 described with reference to FIG. 2. The apparatus 500 may comprise, or be comprised in, one or more of the image processing apparatuses 110, 310, 410, the display controllers 116, 316, 416, the data compressors 117, 317, 417, the GPUs 114, 314, 414 or the GPU data compressor 419 described above.

The apparatus 500 comprises a receiver 510.

The receiver 510 is configured to receive first data representing a rendered image. The first data may be received from a GPU or from memory, for example.

The receiver 510 is also configured to receive second data. The second data is useable to identify at least one target region of the rendered image. The at least one target region is associated with a gaze direction of a viewer. For example, the at least one target region may correspond to a current fixation point of a fovea of a viewer.

The apparatus 500 further comprises a processor 520. The processor 520 may be implemented using machine readable instructions and suitably programmed or configured hardware, such as circuitry.

The processor 520 is configured to process a first portion of the first data in accordance with a first data reduction rate to derive first processed data. The first portion represents the at least one target region.

The processor 520 is further configured to process a second portion of the first data in accordance with a second data reduction rate, different from the first data reduction rate. The second portion represents a further region of the rendered image, different from the at least one target region. For example, the further region may comprise a peripheral region of the image.

The processor 520 is further configured to output at least the first processed data. The at least first processed data may be outputted via a display interface to a display device, for example.

Examples described above relate to image data. In other examples, other types of signal data is processed in a similar manner Examples of other types of signal data include, but are not limited to, audio data, volumetric signal data and video data.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A method of processing image data, the method comprising:
    receiving first data representing a rendered image;
    receiving second data useable to identify at least one target region of the rendered image, the at least one target region being associated with a gaze direction of a viewer;
    processing a first portion of the first data in accordance with a first data reduction rate to derive first processed data, the first portion representing the at least one target region;
    processing a second portion of the first data in accordance with a second data reduction rate, different from the first data reduction rate, the second portion representing a further region of the rendered image, different from the at least one target region;
    processing a third portion of the first data in accordance with a third data reduction rate, the third data reduction rate being intermediate the first data reduction rate and the second data reduction rate, the third portion representing a region of the image that is located between the at least one target region and the further region; and
    outputting at least the first processed data.

2. A method according to claim 1,
    wherein processing the first portion of the first data comprises compressing the first portion of the first data in accordance with a first compression ratio, and
    wherein processing the second portion of the first data comprises compressing the second portion of the first data in accordance with a second, different, compression ratio.

3. A method according to claim 1,
    wherein processing the first portion of the first data comprises performing lossless or visually lossless compression of the first portion of the first data; and
    wherein processing the second portion of the first data comprises performing lossy compression of the second portion of the first data.

4. A method according to claim 1,
    wherein processing the first portion of the first data comprises compressing the first portion of the first data in accordance with a first data rate target,
    wherein processing the second portion of the first data comprises compressing the second portion of the first data in accordance with a second, different, data rate target, and
    wherein the first data rate target and the second data rate target have been derived in dependence on an overall data rate target for compressing the first data.

5. A method according to claim 4, wherein the first and second data rate targets comprise first and second bitrate targets, respectively.

6. A method according to claim 1, the method comprising outputting the at least first processed data for transmission via a display serial interface to a display device.

7. A method according to claim 6, the method comprising outputting the second data for transmission to the display device.

8. A method according to claim 6, wherein the display device comprises a head-mounted display (HMD).

9. A method according to claim 1, wherein processing a given portion of the first data comprises compressing the given portion of the first data using a Display Stream Compression (DSC) protocol.

10. A method according to claim 1, wherein processing the second portion of the first data comprises deriving second processed data, the method comprising outputting the second processed data.

11. A method according to claim 1, wherein, prior to receiving the first data representing the rendered image, the at least one target region of the rendered image is rendered at a first level of quality, and the further region of the rendered image is rendered at a second, different, level of quality.

12. A method according to claim 1, wherein the second data comprises eye-tracking data generated by an eye-tracking sensor.

13. A method according to claim 1,
    wherein the rendered image comprises a current frame of a video,
    the method comprising obtaining third data representing a previous frame of the video,
    wherein processing a given portion of the first data comprises:
        deriving a measure of similarity between the given portion of the first data and a portion of the third data; and
        in response to determining that the derived measure of similarity has a predetermined relationship with a similarity threshold associated with the given portion, outputting the given portion of the first data,
    wherein the first data reduction rate comprises a first similarity threshold and the second data reduction rate comprises a second, different, similarity threshold.

14. A method according to claim 13, wherein the first processed data is arranged to indicate whether or not the given portion of the first data is output.

15. A method according to claim 1,
    wherein processing a given portion of the first data comprises discarding a predetermined number of least significant bits in the given portion of the first data, the predetermined number being associated with the given portion, and
    wherein the first data reduction rate comprises a first number of least significant bits to be discarded and the second data reduction rate comprises a second, different, number of least significant bits to be discarded.

16. A method according to claim 1, performed by a graphics processing unit (GPU), the method comprising outputting the at least first processed data to memory.

17. A method according to claim 1, the method comprising:
- obtaining tile quality metadata indicating a desired quality of compressed data corresponding to a given region of the rendered image; and
- deriving the first and second data reduction rates based on the tile quality metadata.

18. Apparatus for processing image data, the apparatus comprising:
- a receiver configured to:
  - receive first data representing a rendered image; and
  - receive second data useable to identify at least one target region of the rendered image, the at least one target region being associated with a gaze direction of a viewer; and
- a processor configured to:
  - process a first portion of the first data in accordance with a first data reduction rate to derive first processed data, the first portion representing the at least one target region;
  - process a second portion of the first data in accordance with a second data reduction rate, different from the first data reduction rate, the second portion representing a further region of the rendered image, different from the at least one target region;
  - process a third portion of the first data in accordance with a third data reduction rate, the third data reduction rate being intermediate the first data reduction rate and the second data reduction rate, the third portion representing a region of the image that is located between the at least one target region and the further region; and
  - output at least the first processed data.

19. A non-transitory, computer-readable storage medium comprising a set of computer-readable instructions which, when executed by at least one processor, cause the at least one processor to:
- receive first data representing a rendered image;
- receive second data useable to identify at least one target region of the rendered image, the at least one target region being associated with a gaze direction of a viewer;
- process a first portion of the first data in accordance with a first data reduction rate to derive first processed data, the first portion representing the at least one target region;
- process a second portion of the first data in accordance with a second data reduction rate, different from the first data reduction rate, the second portion representing a further region of the rendered image, different from the at least one target region; and
- process a third portion of the first data in accordance with a third data reduction rate, the third data reduction rate being intermediate the first data reduction rate and the second data reduction rate, the third portion representing a region of the image that is located between the at least one target region and the further region; and
- output at least the first processed data.

* * * * *